(12) United States Patent
Pedemonte

(10) Patent No.: US 7,726,618 B2
(45) Date of Patent: Jun. 1, 2010

(54) UNIVERSAL BALL AND SOCKET MOUNT

(76) Inventor: G. Daniel Pedemonte, 1550 N. Lakeshore Dr., Apt #32C, Chicago, IL (US) 60610

( * ) Notice: Subject to any disclaimer, the term of this patent is extended or adjusted under 35 U.S.C. 154(b) by 0 days.

(21) Appl. No.: 12/015,328

(22) Filed: Jan. 16, 2008

(65) Prior Publication Data

US 2008/0169394 A1 Jul. 17, 2008

Related U.S. Application Data

(60) Provisional application No. 60/880,400, filed on Jan. 16, 2007.

(51) Int. Cl.
*A47F 5/00* (2006.01)
*F16D 1/12* (2006.01)

(52) U.S. Cl. .............................. 248/288.51; 248/288.31; 248/229.14; 403/122; 403/87

(58) Field of Classification Search ............ 248/288.51, 248/288.31, 229.14, 534, 535; 403/128, 403/91, 122, 87
See application file for complete search history.

(56) References Cited

U.S. PATENT DOCUMENTS

| 1,972,246 | A | * | 9/1934 | Sauer | 248/481 |
|---|---|---|---|---|---|
| 2,210,147 | A | * | 8/1940 | Griffith | 248/481 |
| 2,340,572 | A | * | 2/1944 | Smith | 248/661 |
| 2,560,884 | A | * | 7/1951 | Nagourney | 248/124.1 |
| 3,255,722 | A | * | 6/1966 | Ferdinand et al. | 108/147.15 |
| 3,554,479 | A | * | 1/1971 | Slemmons | 248/289.11 |
| 4,440,440 | A | * | 4/1984 | Juy | 297/215.14 |
| 4,626,123 | A | * | 12/1986 | Brown | 403/141 |
| 4,767,087 | A | * | 8/1988 | Combu | 248/62 |
| 4,986,001 | A | * | 1/1991 | Giamattei | 33/265 |
| 5,441,225 | A | * | 8/1995 | Hall | 248/231.61 |
| 5,667,176 | A | * | 9/1997 | Zamarripa et al. | 248/231.51 |
| 5,775,654 | A |   | 7/1998 | Price |  |
| 6,220,556 | B1 | * | 4/2001 | Sohrt et al. | 248/279.1 |
| 7,523,906 | B2 | * | 4/2009 | Bennett | 248/288.51 |

* cited by examiner

*Primary Examiner*—Anita M King
(74) *Attorney, Agent, or Firm*—McDonnell Boehnen Hulbert & Berghoff LLP

(57) ABSTRACT

The invention includes a mount with a knob including a shaft extending therefrom. A two piece socket housing defines a socket therebetween. The two piece socket has a portion formed as a first clamp element. A ball member is disposed in the socket and includes a slot and an attachment structure. A second clamp element has a connector, preferably an internally threaded nut captured therein. The shaft passes through a first portion of the two piece socket, the slot of the ball member, a second portion the two piece socket and terminates in the second clamp element, such that when the knob is manipulated, the two piece socket fixes the ball member in position and a clamping force is generated between the first clamp element and the second clamp element.

1 Claim, 7 Drawing Sheets

UNIVERSAL BALL AND SOCKET MOUNT

This application claims benefit of U.S. Provisional Patent Application No. 60/880,400, filed Jan. 16, 2007.

FIELD OF THE INVENTION

The invention relates to the field of ball and socket type mounts.

BACKGROUND OF THE INVENTION

There are numerous mounts or clamps which use a ball and socket arrangement of parts. These devices have the advantage of permitting movement of the ball in the socket to adapt the mount to various conditions. These devices have more flexibility regarding applications and adaptations. However, they are often complex and heavy and thus, often cumbersome, and furthermore can be lacking in clamping accuracy. Furthermore, attaching one of the prior art ball and socket devices to something else often requires a complex secondary clamping arrangement.

There is a need for a simple and flexible universal mount that overcomes the above deficiencies. The invention satisfies the demand.

SUMMARY OF THE INVENTION

Now, with the foregoing in mind, the current invention provides a universal mount to a structural element, like a chair frame member, including a clamp portion and a ball and socket mounting element.

The invention includes a mount, including a knob including a shaft extending therefrom. A two piece socket housing defines a socket therebetween. The two piece socket has a portion formed as a first clamp element. A ball member is disposed in the socket and includes a slot and an attachment structure. A second clamp element has a connector, preferably an internally threaded nut captured therein. The shaft passes through a first portion of the two piece socket, the slot of the ball member, a second portion the two piece socket and terminates in the second clamp element, such that when the knob is manipulated, the two piece socket fixes the ball member in position and a clamping force is generated between the first clamp element and the second clamp element.

The present invention will be further appreciated, and its attributes and advantages further understood, upon consideration of the following detailed description of an embodiment of the invention, taken in conjunction with the accompanying drawings.

DETAILED DESCRIPTION OF AN EMBODIMENT OF THE INVENTION

Figure 1:
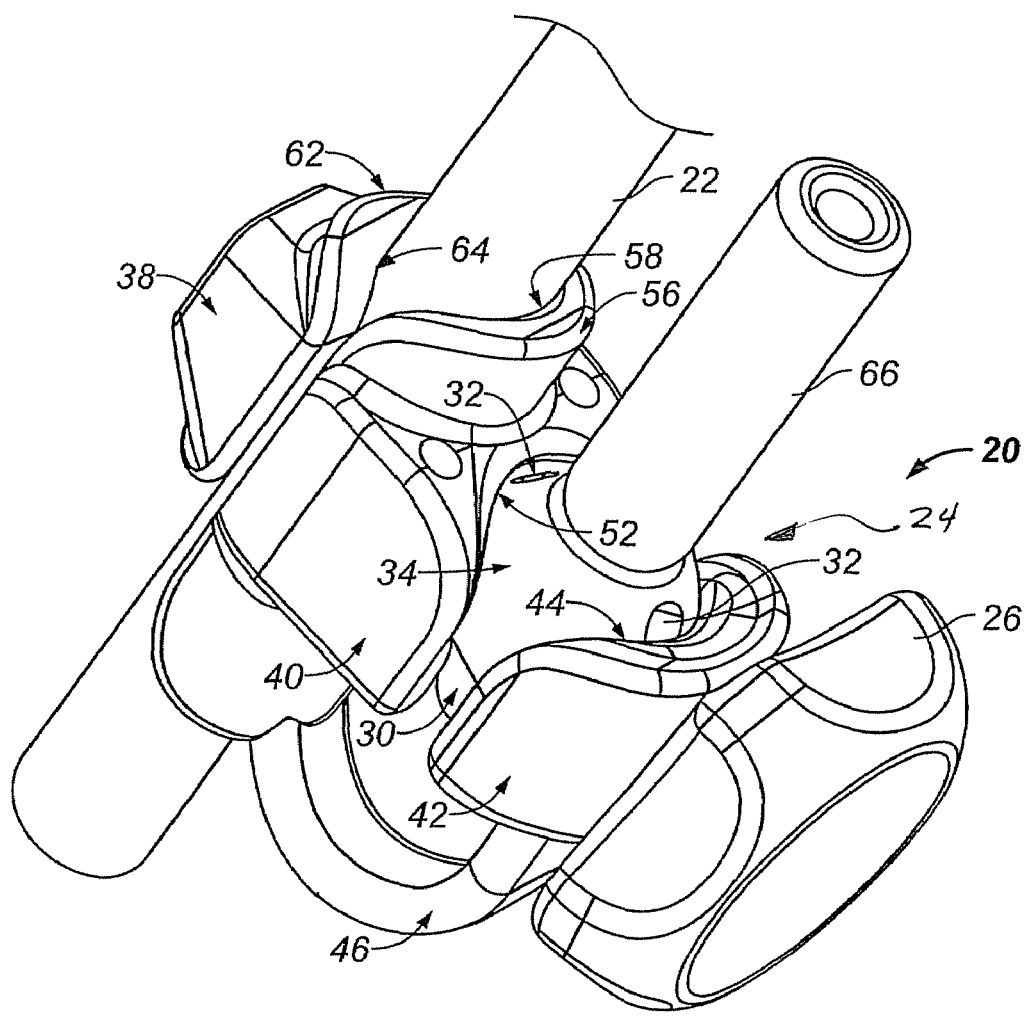
FIG. 1 shows a perspective side view of a universal ball and socket mount according to one embodiment of the invention.
Figure 2:
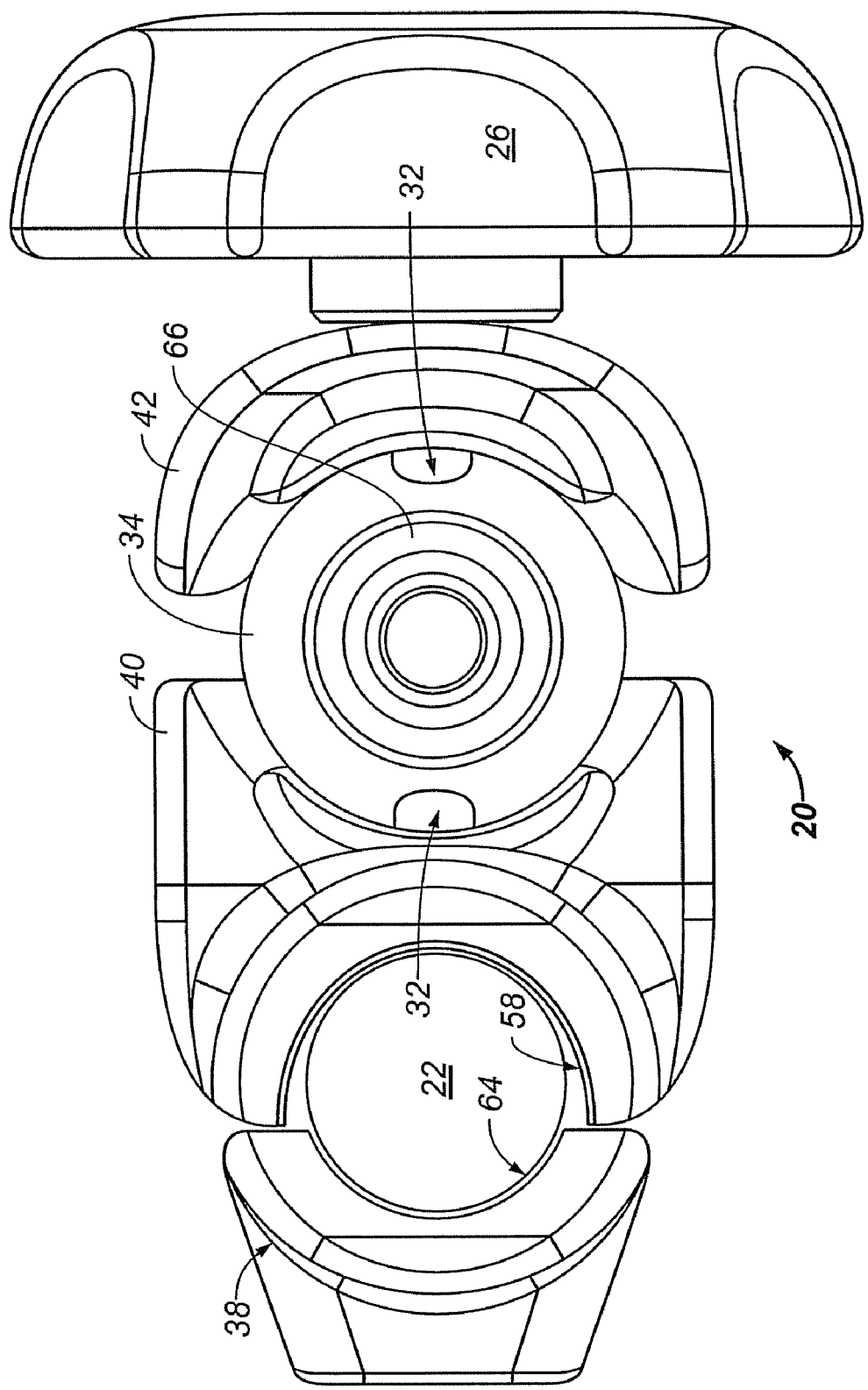
FIG. 2 shows a top view of the universal ball and socket mount of FIG. 1.

The embodiment of the invention shown in FIGS. 1-6, described hereinafter uses identical reference characters to indicate identical elements in the figures. Generally, the invention, a universal ball and socket mount 20, includes a clamping aspect and a ball and socket aspect. The elements of the universal ball and socket mount 20 cooperate to both clamp the mount to a support element, like a pole or tube 22, for example, and restrain the ball and socket 24 in a desired orientation.

The mount 20 includes a handle, preferably in the shape of a knob 26 or the like. The knob 26 may be any suitable size and shape for manipulation by a person or tool. The knob 26 may be a cam lever. The knob 26 is preferably made of plastic, but any suitable material is contemplated.

The knob 26 includes a threaded shaft 28 connected to the knob in a manner so that the shaft rotates when the knob is turned. The shaft 28 may be a smooth non-threaded element. The shaft 28 extends through the two piece socket 30, extends through a slot 32 formed through the ball 34, and terminates by preferably engaging a threaded nut 36 captured in an outer clamp member 38. Note that preferably the shaft 28 is threaded only where it engages the nut 36. In an alternate embodiment the shaft is merely fastened to the outer clamp member 38.

Turning the knob 26 or manipulating the lever (if a cam-shaped device) causes the threaded nut 36 and the outer clamp member 38 to be drawn together. This also draws inner socket portion 40 and outer socket portion 42 together.

The above-described action causes a clamping action to be generated between the outer clamp member 38 and the two piece socket 30 to clamp the mount 20 to a structural member 22. At the same time, a clamping force is generated between inner socket portion 40 and outer socket portion 42 to clamp the ball 34 therein.

The outer socket portion 42 has a spherical inner surface 44 through which the shaft 28 passes. The outer socket portion 42 may be held in position and next to the inner socket portion 40 by a rib 46. The outer clamp member 38 and two piece socket 30 may be tethered together by a tether 70 to prevent loss or disassociation of parts of the mount 20 or another means of preventing disassociation of parts like a hinge of material or the like.

Figure 5:
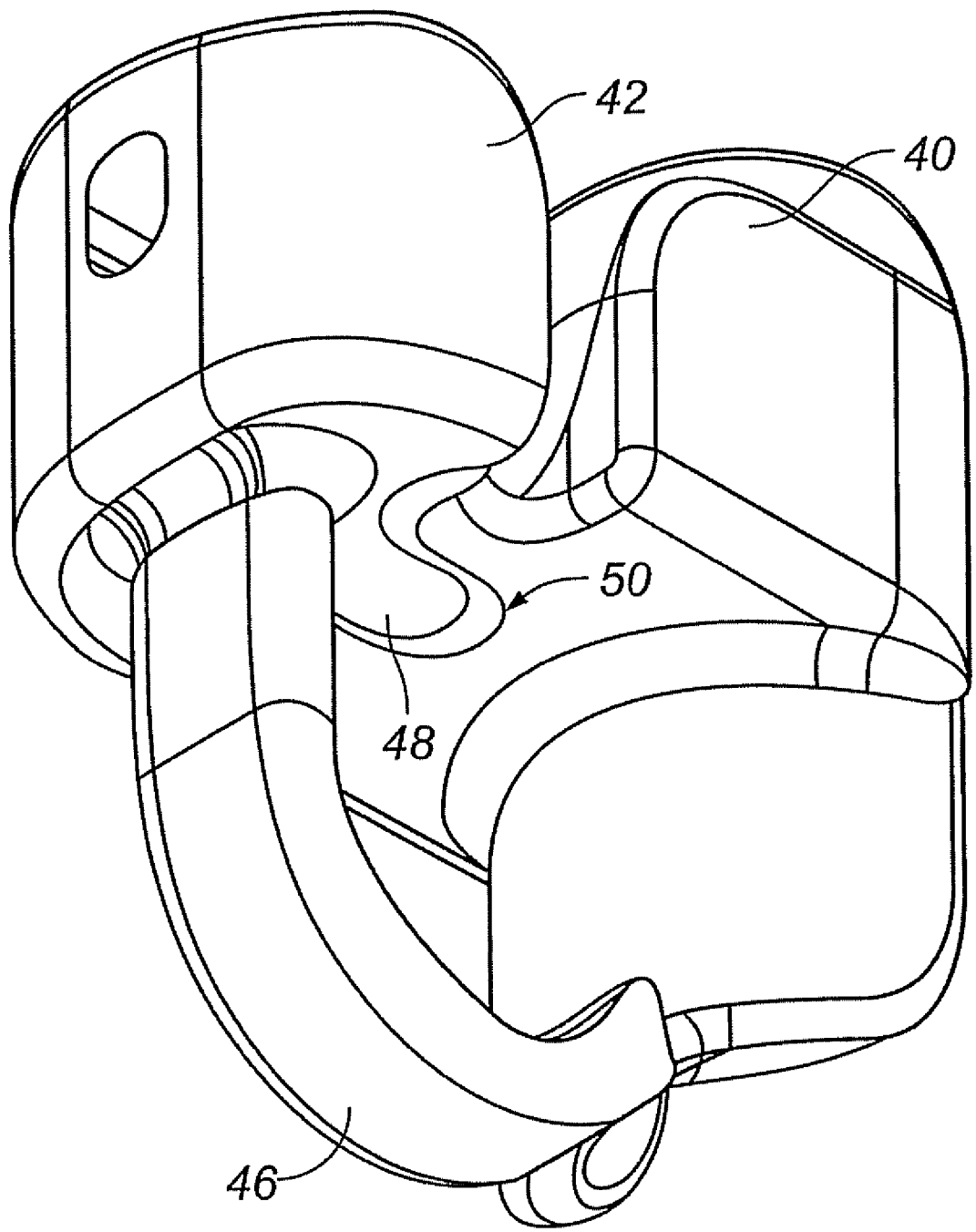
FIG. 5 shows a perspective bottom view of the two piece socket of the universal ball and socket mount of FIG. 1.
Figure 6:
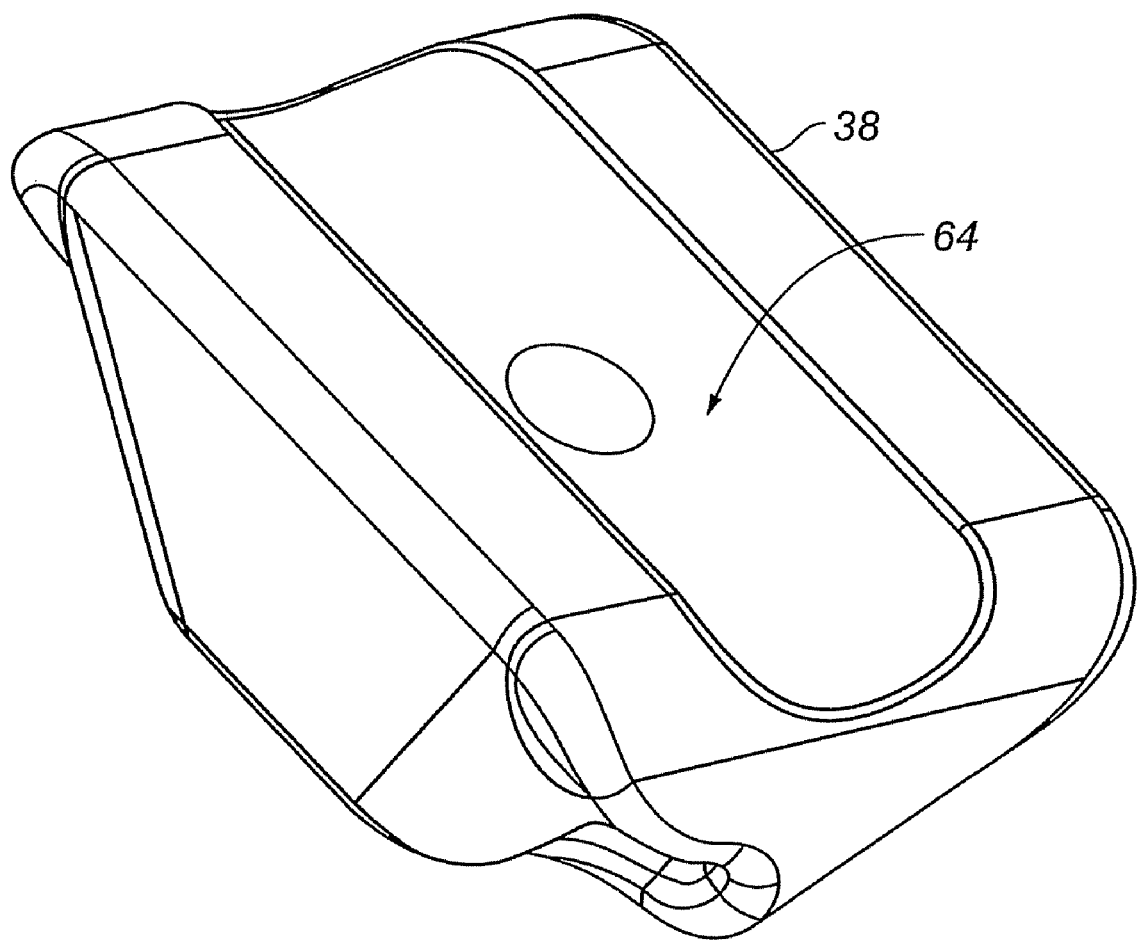
FIG. 6 shows an outer clamp element of the universal ball and socket mount of FIG. 1.

Best seen in FIG. 5, the outer socket portion 42 includes a projection or tongue 48. The projection 48 fits into and cooperates with a groove or mouth 50 to maintain alignment of the outer socket portion 42 with the inner socket portion 40. When the knob 26 is tightened the tongue 48 and groove 50, also referred herein as an alignment feature 54, keep the socket parts aligned and enable the clamping of the ball 34 to be very positive. It will be understood that the locations of the elements of the alignment feature 54 can be reversed from that shown.

Figure 3:
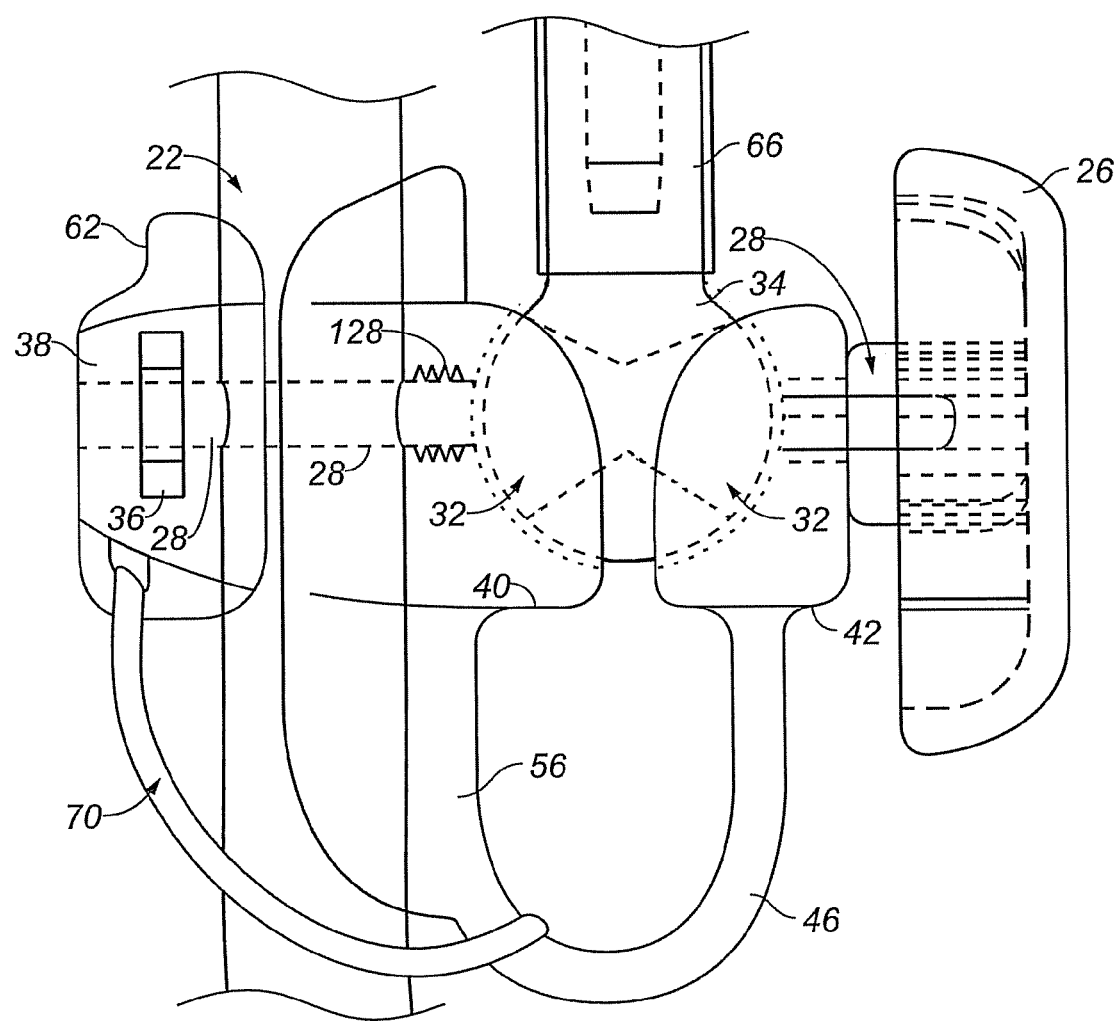
FIG. 3 shows a side view of the universal ball and socket mount of FIG. 1, with some of the internal structure shown.
Figure 4:
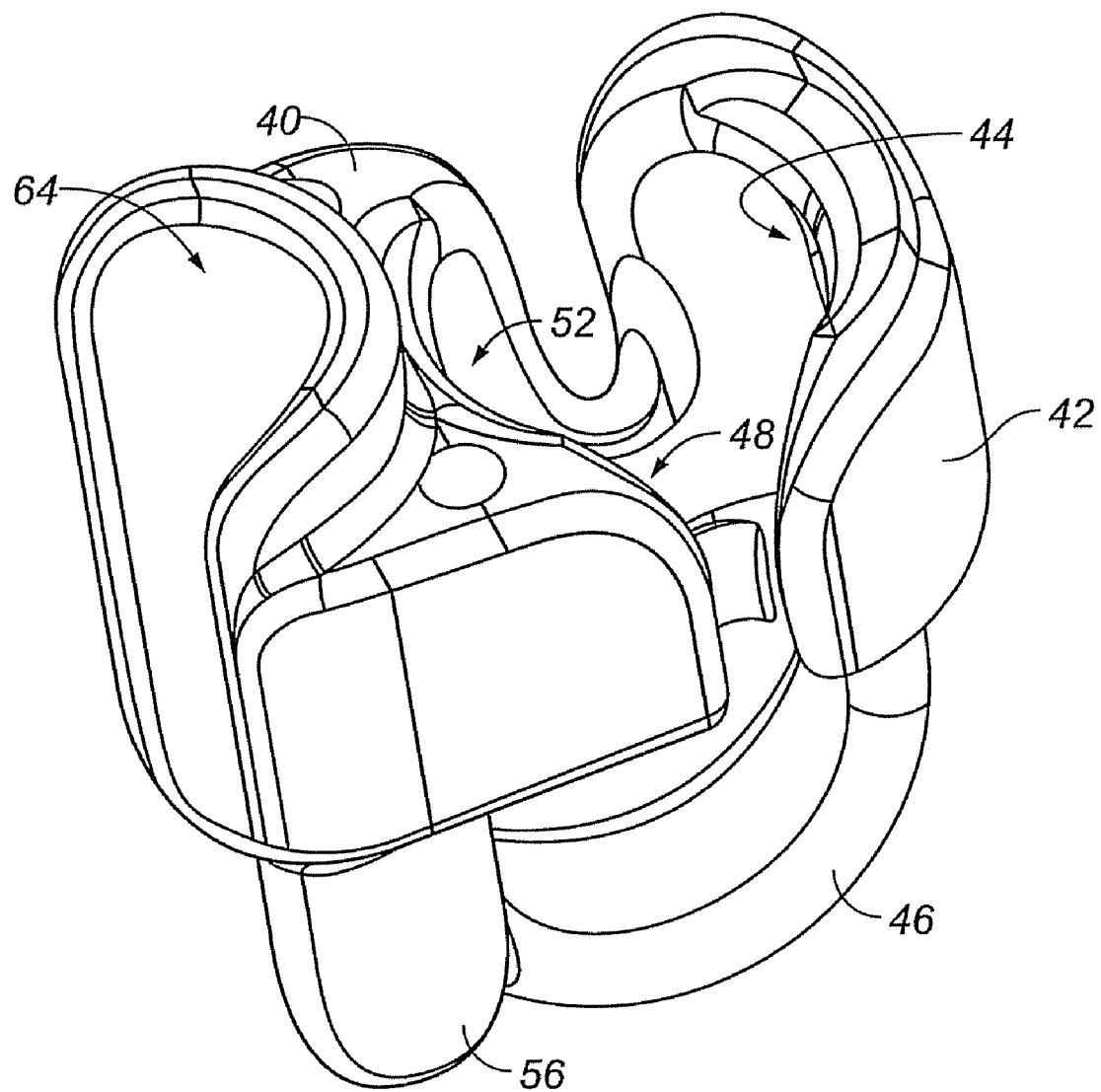
FIG. 4 shows a perspective top view of the two piece socket of the universal ball and socket mount of FIG. 1.

The inner socket portion 40 has a spherical inner surface 52 through which the shaft 28 passes and preferably internal threads 128 (see FIG. 3). On a side of the inner socket portion 40 opposite the spherical inner surface 52 is an inner clamp structure 56. The inner clamp structure 56 includes a surface 58 which preferably conforms in shape to a structural element (e.g., tube 22) to which it is to be attached. For example, if the mount 20 is to be attached to cylindrical tube 22, the surface 58 may best be concave and cylindrical to match the cylindrical shape of the tube. Of course, non-cylindrical structural elements are contemplated.

Outer clamp member 38 has a captured nut 36, as is known in the art, to receive the threaded connector 28 and an outer clamp structure 62 formed to cooperate with the inner clamp structure 56 to hold to the structural element. The outer clamp structure 62 includes a surface 64 which cooperates with surface 58 to clamp the mount 20 to the structure 22. It will be understood that the structure 22 has a hole formed therethrough (not shown) to permit the shaft 28 to pass through.

The ball 34 is sized and shaped to reside and pivot within the two piece socket 30. The ball 34 also has an attachment structure; in this example, a post 66, for receiving or attaching to accessories (not shown) like an umbrella, a flag, an antenna, an electronic device, a solar panel or any number of accessories or devices which a user might wish to attach to something else. In the present example, the post 66 may receive a hollow handle of an umbrella, for example, slid over the post and the umbrella may be clamped to a round structural member 22 of a chair, for example. The ball 34 includes a slot 32, through which the shaft 28 passes, to permit pivoting of the ball along all or any of three axis of movement.

Figure 7:
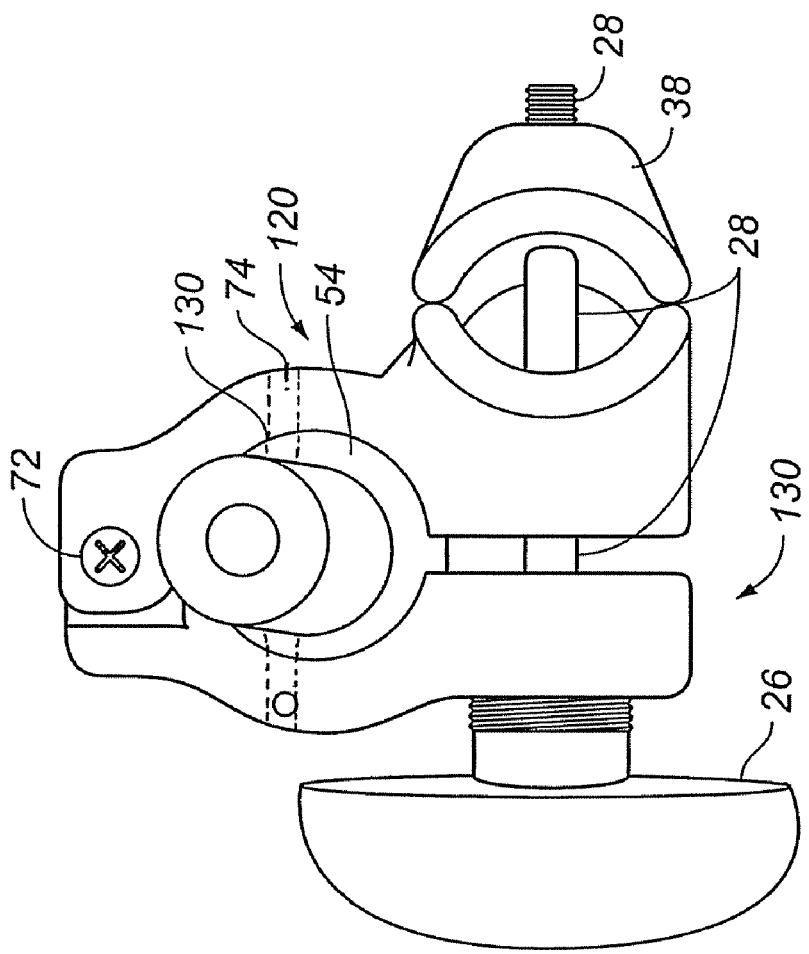
FIG. 7 shows an embodiment of a universal ball and socket mount similar to that shown in FIG. 1, with a hinge connecting two parts of a two piece socket.

FIG. 7 shows an alternate embodiment of a mount 120. The mount 120 is similar to the preceding embodiment, including a knob 26 with a threaded shaft 28 which passes through a two piece socket housing 130 with a socket 130'. The shaft 28 threadably engages an outer clamp member 38. The two piece socket 130 holding a ball 34 is coupled with a hinge 72. Closing the two piece socket 130 by advancing the knob 26 and thereby closing the two piece socket to the outer clamp member 38 clamps the mount 120 to a structural member (not shown) and closes the socket on the ball 34. The socket 130' includes a pin 74 which passes through a slot (not shown) in the ball 34.

The holding power of the socket may be increased by providing a high friction material on the ball, socket or both. Also, a material, film or the like can be used.

While the present invention has been described with respect to a particular embodiment, those of skill in this art will recognize even more variations, applications and modifications which will still fall within the spirit and scope of the invention, all as intended to come within the ambit and reach of the following claims.

What is claimed is:

1. A mount, comprising:
    a knob including a threaded shaft extending therefrom;
    a two piece socket housing defining a socket therebetween, the two piece socket comprising an outer socket portion having an outer socket inner surface facing the socket and an inner socket portion having a inner socket first surface facing the socket and an inner socket second surface facing a direction away from the socket, wherein the outer socket portion is positioned adjacent the knob, and wherein the two niece socket housing defines a first clamp element;
    a ball member disposed in the socket between the outer socket inner surface and the inner socket first surface, the ball member having a slot and an attachment structure formed as a unitary extension of the ball member; and
    a second clamp element comprised of the inner socket portion and an outer clamp member, the outer clamp member having a connector captured therein for connecting to the shaft, wherein the shaft passes, in the following specified order: through the outer socket portion, the slot of the ball member, the inner socket portion and terminates in the outer clamp member, such that when the knob is manipulated to draw together the first clamp element and the second clamp element, the two piece socket fixes the ball member in position in the socket and a clamping force is also generated between the inner socket portion and the outer clamp member, and further comprising a rib extending between the outer socket portion and the inner socket portion and attaching the inner and outer socket portions together.

* * * * *